March 17, 1970     P. J. SAUTIER     3,500,717
ROCKET-BOMB MAGAZINE
Filed July 22, 1968     2 Sheets-Sheet 1
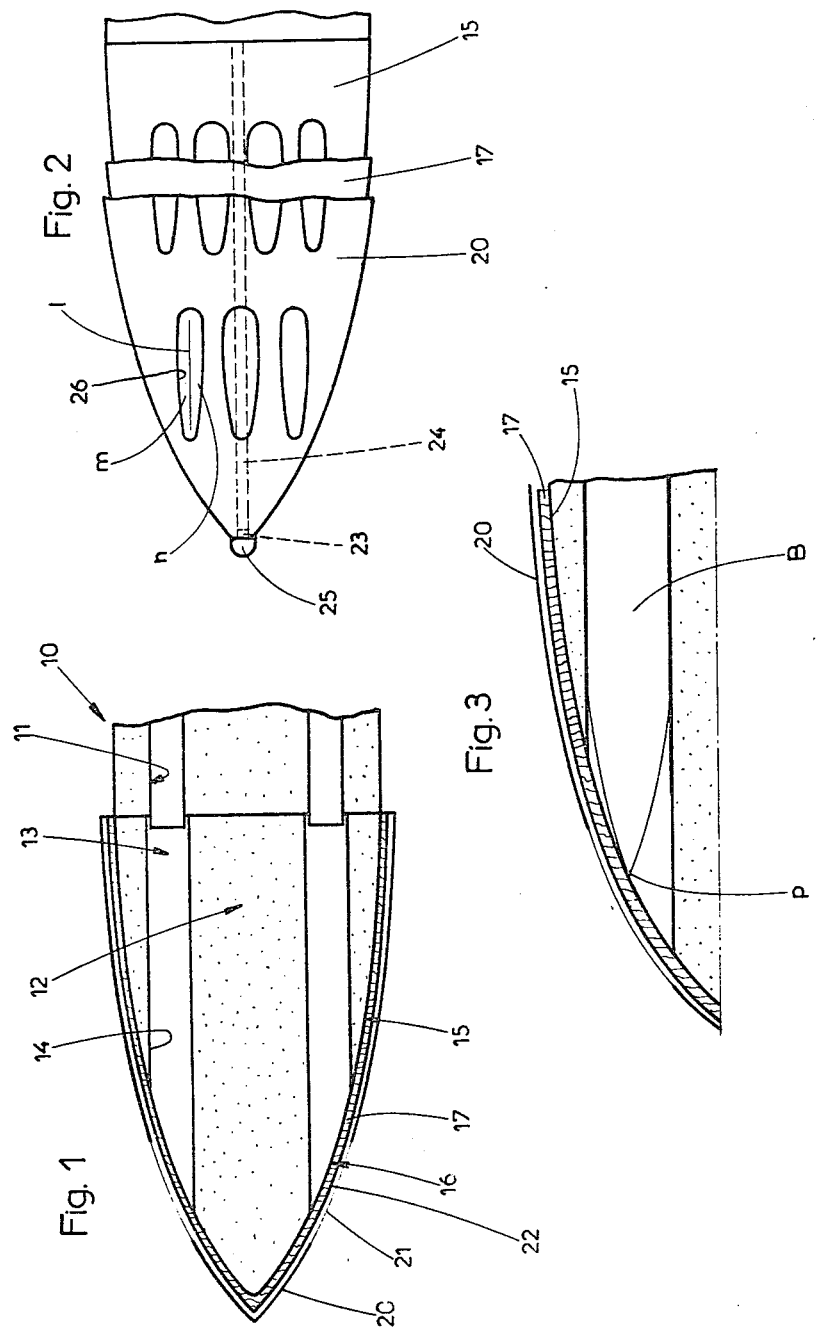

United States Patent Office 3,500,717
Patented Mar. 17, 1970

3,500,717
ROCKET-BOMB MAGAZINE
Pierre J. Sautier, Paris, France, assignor to Engins Matra, Paris, France, a French company
Filed July 22, 1968, Ser. No. 746,387
Int. Cl. F41f 3/04
U.S. Cl. 89—1.817           4 Claims

ABSTRACT OF THE DISCLOSURE

A rocket magazine has a body with a plurality of parallel guide channels therein adapted for respectively receiving a rocket bomb, the front of the body being of ogival shape and having a frangible cover applied continuously thereon with an ogival cap on and covering the surface of the cover. The cap is provided with apertures coinciding in shape with the theoretical section formed by the intersection of the prolongation of the channels with the cap to restrict the area of the opening formed in the cover upon the launching of a rocket bomb to the area of the associated aperture in the cap.

---

The invention relates to an improvement to rocket-bomb magazines.

The launching of rocket bombs from aircraft, particularly from high speed aircraft, entails problems which have not yet been perfectly solved.

The conditions that must be fulfilled by a rocket-bomb magazine are, in fact, numerous and, sometimes, conflicting.

The rocket-bomb magazine is immersed in a fluid, viz air, in relation to which it travels at high speed, the fluid being moreover compressive.

It is desirable that the presence of a rocket-bomb magazine modifies as little as possible the aerodynamic quality of the aircraft; the rocket bombs held in the magazine must not be submitted to too high a temperature, which might produce a risk of explosion and be fatal to the equipped aircraft.

The rocket bombs are contained in a plurality in the magazine and it is desirable that the operator may fire a required number of rocket bombs for the assigned mission, without inconvenience either to the aerodynamic qualities of the aircraft or regarding security, as regards the remaining rocket bombs.

It has already been proposed to provide, in a rocket-bomb magazine, a nest of guide tubes in side by side relationship, with a tapering forward part or nose reducing the aerodynamic drag introduced by the magazine.

It has (been ascertained that rocket bombs held in such a magazine, were subject to overheating at their ogive, which could make them explode prematurely.

It has been proposed to close the tubes to avoid overheating due to the penetration of the air at high speed.

However the plugs are difficult to keep in the tubes, the reason being their deformation due mainly to temperature variation. Moreover the effect of the plug must be overcome by the rocket itself upon launching. In case of loss of a plug before firing the corresponding rocket bomb, a risk of destruction of the aircraft occurs.

It has been proposed to fit the anterior area at the front point of a magazine with an easily breakable cover which remains in place as long as a rocket is not fired.

However in most realizations, the firing of the first rocket destroys completely the cover, whereupon the other rockets are not protected.

The realization in which the cover of the streamlined body has zones more fragile than others, so as to localize rupture, have not so far given full satisfaction, namely due to the fact that the said cover can undergo a displacement in relation to the body.

The fragility zone between two adjacent open holes being excessive can produce in some case by reaction effect, a push towards the front of the said cover.

The improvement according to the invention, contemplates the elimination of the inconvenience of magazines having a streamlined nose and fulfill practically all conditions required for such a magazine, which can be easily and economically made.

It is an object of the invention to supply a rocket bomb magazine which always presents highly valuable aerodynamics properties and thermically protects in all circumstances the rockets contained in the magazine.

It is particularly one of the objects of the invention, to supply an improved rocket-bomb magazine, in which only the tubes corresponding to launched rocket bomb are open, the tubes still containing rocket bombs remaining closed at their forward end.

According to the invention the tapered forward body of the magazine, or nose, is covered with a wall which is penetrated by a launched rocket bomb, the said wall being itself being covered by a cap, metallic or otherwise, presenting apertures corresponding to the openings of the tubes and strongly maintained against said wall, in such a way that the breakage of this latter during rocket bomb launching is limited to the passage holes of the rockets actually fired.

The invention will be more fully understood by the following description, given by way of example and referring to the annexed drawing, in which:

FIGURE 1 is a view, in longitudinal section, of a part of a rocket bomb magazine according to the invention;

FIGURE 2 is a top view with partially cut away;

FIGURE 3 is a longitudinal sectional view, on a larger scale, of a portion of the rocket bomb.

Figure 4:
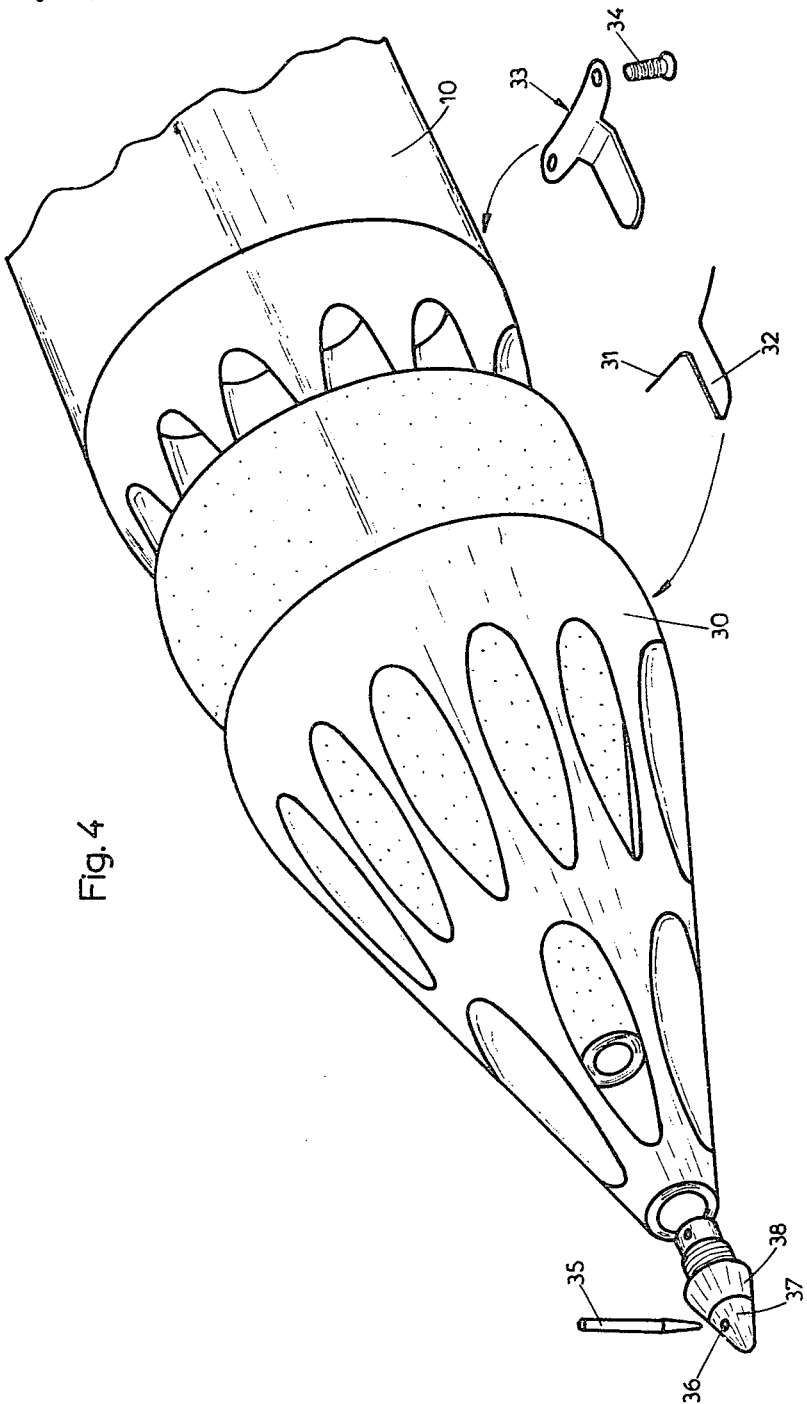
FIGURE 4 is an exploded perspective view of a variation of a rocket bomb magazine.

The rocket bomb magazine according to the invention comprises a cylindrical body 10, holding a nest of parallel guide tubes 11; each tube is intended to receive at least one rocket bomb, known means being provided for the firing of the rocket bombs simultaneously or according to a desired sequence, the number of the launched rocket bombs being chosen at will.

At the forward end, the body 10 terminates in a tapered front body 12, having channels 13 in alignment with the tubes 11, the said channels being formed by tubular sections 14 maintained, for instance, by their incorporation in a foam material. The anterior surface 15 of said body 12 is ogival and has apertures 16 at the openings of the tubular sections 14, the elongated contour of said apertures varying somewhat according to their distance to the plan 16 along which the anterior body 12 and body 10 are connected.

The anterior area 15 of the anterior body 12 is lined with a cover 17 having the shape of a hollow ogive, or cone, which has no apertures for the passage of the rocket bombs; the cover 17, of uniform thickness as a rule, is made advantageously of reinforced synthetic material. The synthetic material is a resin, for instance, a flexible polyester and a reinforcement constituted by one or several layers of fibre glass. The resin is choosen to be easily perforated by a launched rocket, so that the fracture produced does not have an excessive tendency to spread over the complete area of the cover.

In accordance with this invention, the cover 17 is in turn recovered by a cap 20, made, for instance, of a metallic sheet, which has apertures 21 at the opening of the prolongated tubular sections 14, the contours of which correspond to the intersections of said cap by the said prolongations.

In accordance with this invention, also, the said cap is firmly applied to the external face 22 of the cover 17. To this effect, for instance, a connection by a threaded rod 24 joining the cap and the anterior body 12 is provided; a locking part 25 screws onto the threaded end 23 of rod 24.

It has been proved that with such a magazine, the launching of a rocket bomb, although occuring with the maximum security (the resistance of the cover 17 at the opening of the tubular section 14 being light enough not to interfere with the projection) did not produce any opening of another tubular section, even an adjacent one. This is probably due to the fact that at the impact of the point (FIG. 3) of a rocket bomb B against cover 17, the latter is first pierced and afterwards progressively torn following a line as shown at 1 (FIG. 2), which is disposed approximately along the main axis of the opening of the said section on the said cover, the lips $m$ and $n$ bending at either side of the line 1 around the outline 26 of the aperture 21 of the cap 20.

The transversal tear lines limiting the lips $m$ and $n$ cannot prolong themselves beyond outliine 26 and thus the piercing by a rocket bomb of the cover 17 does not result in the opening of tubular sections other than the one pierced by the launched rocket bomb.

Each rocket bomb is thus, as long as it has not been fired, protected against overheating, which would result from the air flowing at high speed if the anterior section of the latter was opened.

On the other hand the opened apertures are strictly limited to these corresponding to the launched rocket bombs, so that at all times the aerodynamic resistance of the improved magazine is a minimum, with respect to the rocket bombs contained thereby.

Reference is now made to FIGURE 4, connecting a variation. According to this variation the cap 30, similar to the one already described, has on its posterior side 31 a slot 32 intended to insure the angular position of said cap in relation to body 10. To this effect, body 10 carries a lug 33, mating with the slot 32; screws are provided for the fixation of lug 33.

In this variation also a pin 35 mating with a hole 36 of appendix 37 of the head 38 secures the locking of the cap against the breakable cover 17.

What is claimed is:

1. A magazine for aircraft rocket bombs comprising an elongate body having a plurality of parallel receiving and guiding channels extending throughout the length thereof, each adapted for receiving one rocket bomb, said body having a frontal surface of ogival configuration, a continuous ogival cover on said body applied in contact with said frontal surface and constituted of a material penetrable by the rocket bombs upon launching, and a cap on said cover of ogival shape and applied in surface contact with the cover, said cap having perforations therein coinciding in shape with the theoretical section formed by the intersection of said cap with the prolongations of said channels.

2. A magazine as claimed in claim 1 comprising a clamping member engaging the cap to hold the same against the cover, and the cover against the said frontal surface.

3. A magazine as claimed in claim 1 comprising cooperating angular positioning means between said cap and said body.

4. A magazine as claimed in claim 1, wherein said cap is constituted of a strong material to limit the breakage of the cover to the area of the perforations of the cap.

References Cited

UNITED STATES PATENTS

| | | | |
|---|---|---|---|
| 2,763,189 | 9/1956 | Grill | 89—1.817 |
| 3,140,638 | 7/1964 | De Luca | 89—1.817 |
| 3,342,104 | 9/1967 | Robert | 89—1.817 |
| 3,397,638 | 8/1968 | Gould | 89—1.817 |

SAMUEL W. ENGLE, Primary Examiner

U.S. Cl. X.R.

89—31